(12) United States Patent
Har-Noy et al.

(10) Patent No.: US 10,078,645 B2
(45) Date of Patent: *Sep. 18, 2018

(54) CROWDSOURCED FEATURE IDENTIFICATION AND ORTHORECTIFICATION

(71) Applicant: DigitalGlobe, Inc., Longmont, CO (US)

(72) Inventors: Shay Har-Noy, San Diego, CA (US); Luke Barrington, Boulder, CO (US); Nathan Ricklin, Boulder, CO (US)

(73) Assignee: DigitalGlobe, Inc., Longmont, CO (US)

( * ) Notice: Subject to any disclaimer, the term of this patent is extended or adjusted under 35 U.S.C. 154(b) by 720 days.

This patent is subject to a terminal disclaimer.

(21) Appl. No.: 14/680,495

(22) Filed: Apr. 7, 2015

(65) Prior Publication Data

US 2015/0331890 A1     Nov. 19, 2015

Related U.S. Application Data

(63) Continuation-in-part of application No. 14/049,199, filed on Oct. 8, 2013, now Pat. No. 9,128,959, which
(Continued)

(51) Int. Cl.
| | |
|---|---|
| *G06Q 10/10* | (2012.01) |
| *G06Q 10/06* | (2012.01) |
| *G06Q 30/02* | (2012.01) |
| *G06Q 30/06* | (2012.01) |
| *G06Q 99/00* | (2006.01) |
| *G06F 17/30* | (2006.01) |
| *G06F 3/0484* | (2013.01) |
| *G06F 3/0482* | (2013.01) |
| *G06Q 50/00* | (2012.01) |

(52) U.S. Cl.
CPC ...... *G06F 17/30268* (2013.01); *G06F 3/0482* (2013.01); *G06F 3/04842* (2013.01); *G06F 17/3087* (2013.01); *G06F 17/30241* (2013.01); *G06F 17/30554* (2013.01); *G06F 17/30598* (2013.01); *G06Q 10/101* (2013.01); *G06Q 10/103* (2013.01); *G06Q 30/0282* (2013.01); *G06Q 50/01* (2013.01)

(58) Field of Classification Search
CPC ... G06Q 10/101; G06Q 50/01; G06Q 30/0282
USPC .................................................. 705/1.1–912
See application file for complete search history.

(56) References Cited

U.S. PATENT DOCUMENTS

| | | | | |
|---|---|---|---|---|
| 8,379,913 | B1 * | 2/2013 | Robinson | G06K 9/6254 382/100 |
| 8,620,532 | B2 * | 12/2013 | Curtis | G06O 30/0282 370/401 |

(Continued)

*Primary Examiner* — Jonathan P Ouellette
(74) *Attorney, Agent, or Firm* — Galvin Patent Law LLC; Brian R. Galvin

(57) ABSTRACT

A crowdsourced search and locate platform, comprising an application server that receives input from a plurality of user devices and navigates to a particular location, sends images of the location to a user device, and receives tagging data provided by the device user, and a client interface application that displays a plurality of interactive elements to a user, receive input from the user, and provide the results of the input to the application server, and methods for operating and administering a crowdsourced search and locate platform.

6 Claims, 9 Drawing Sheets

Related U.S. Application Data is a continuation of application No. 13/841,392, filed on Mar. 15, 2013, now abandoned, application No. 14/680,495, filed on Apr. 7, 2015, which is a continuation-in-part of application No. 14/010,450, filed on Aug. 26, 2013, now Pat. No. 9,122,708, which is a continuation of application No. 13/839,379, filed on Mar. 15, 2013, now abandoned, application No. 14/680,495, filed on Apr. 7, 2015, which is a continuation-in-part of application No. 14/049,189, filed on Oct. 8, 2013, now Pat. No. 9,560,092, which is a continuation of application No. 13/840,993, filed on Mar. 15, 2013, now abandoned, application No. 14/680,495, filed on Apr. 7, 2015, which is a continuation-in-part of application No. 13/840,173, filed on Mar. 15, 2013, now Pat. No. 9,032,000.

(60) Provisional application No. 61/976,470, filed on Apr. 7, 2014, provisional application No. 61/766,673, filed on Feb. 19, 2013, provisional application No. 61/766,644, filed on Feb. 19, 2013, provisional application No. 61/766,677, filed on Feb. 19, 2013, provisional application No. 61/766,655, filed on Feb. 19, 2013.

(56) References Cited

U.S. PATENT DOCUMENTS

| | | | |
|---|---|---|---|
| 2007/0162761 A1* | 7/2007 | Davis | G06Q 10/00 713/182 |
| 2013/0086112 A1* | 4/2013 | Everingham | G06F 17/30893 707/780 |
| 2013/0132190 A1* | 5/2013 | Lagle Ruiz | G06Q 30/0241 705/14.49 |
| 2013/0183952 A1* | 7/2013 | Davis | H04W 4/001 455/418 |
| 2013/0211700 A1* | 8/2013 | Igodt | G01C 21/32 701/117 |
| 2013/0226667 A1* | 8/2013 | Terrazas | G06Q 30/0205 705/7.34 |
| 2013/0273968 A1* | 10/2013 | Rhoads | G06F 17/30244 455/556.1 |
| 2014/0101691 A1* | 4/2014 | Sinha | G06F 17/3082 725/32 |
| 2014/0149301 A1* | 5/2014 | Dickinson | G06Q 10/00 705/319 |
| 2014/0188537 A1* | 7/2014 | Milbert | G09B 29/00 705/7.14 |

* cited by examiner

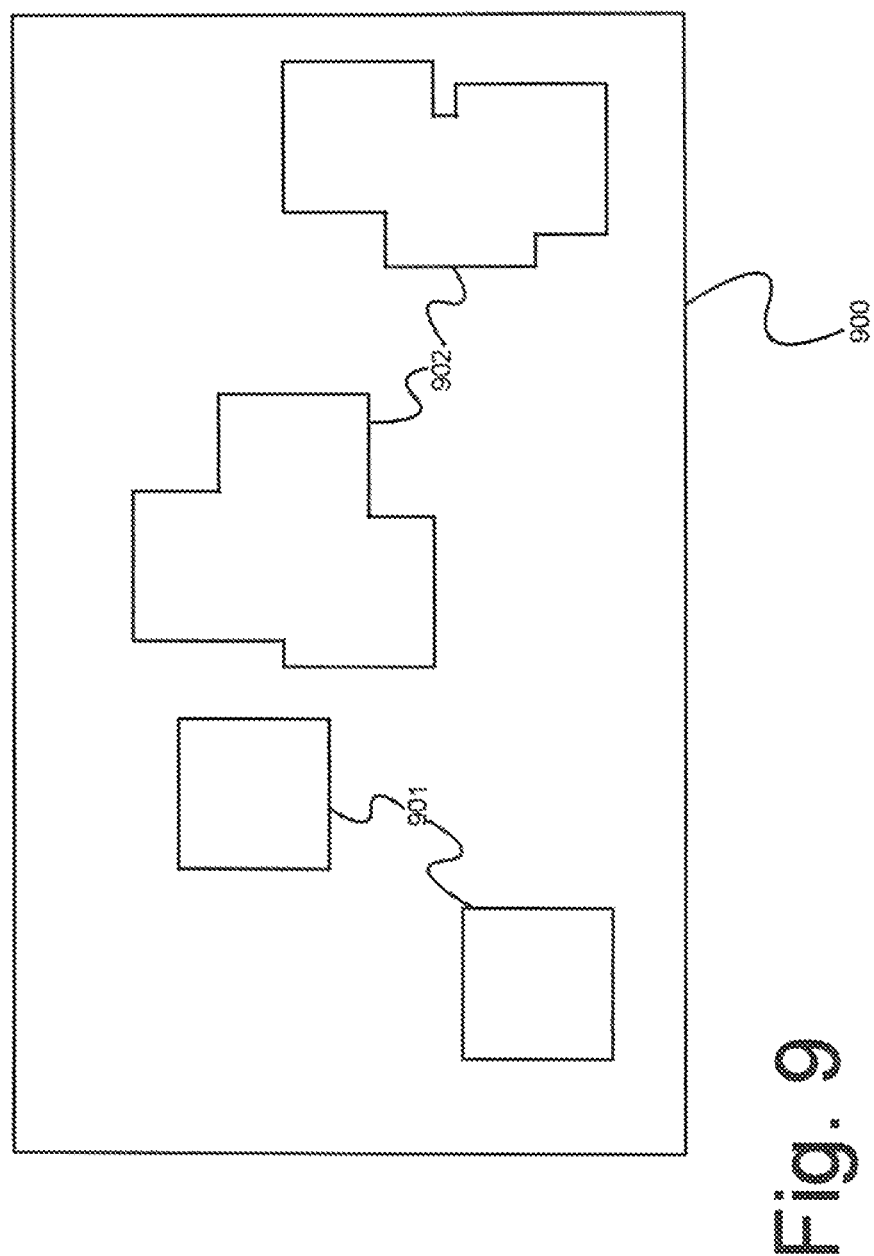

CROWDSOURCED FEATURE IDENTIFICATION AND ORTHORECTIFICATION

CROSS-REFERENCE TO RELATED APPLICATIONS

This application claims a benefit, and priority, to U.S. provisional patent application Ser. No. 61/976,470, filed on Apr. 7, 2014, titled "CROWDSOURCED FEATURE IDENTIFICATION AND ORTHORECTIFICATION", the entire specification of which is incorporated herein by reference. This application is also a continuation-in-part of U.S. patent application Ser. No. 14/049,199, titled "CROWDSOURCED SEARCH AND LOCATE PLATFORM", filed on Oct. 8, 2013, which is a continuation of U.S. patent application Ser. No. 13/841,392, titled "CROWDSOURCED SEARCH AND LOCATE PLATFORM", filed on Mar. 15, 2013, which claims priority to U.S. provisional patent application Ser. No. 61/766,673, titled "CROWDSOURCED SEARCH AND LOCATE PLATFORM, filed on Feb. 19, 2013, the entire specification of each of which is incorporated in its entirety hereby by reference. The present application is also a continuation-in-part of U.S. patent application Ser. No. 14/010,450, titled "CROWDSOURCED SEARCH AND LOCATE PLATFORM", filed on Aug. 26, 2013, which is a continuation of U.S. patent application Ser. No. 13/839,379, titled "CROWDSOURCED SEARCH AND LOCATE PLATFORM", filed on Mar. 15, 2013, which claims priority to U.S. provisional patent application Ser. No. 61/766,644 titled "CROWDSOURCED SEARCH AND LOCATE PLATFORM", filed on Feb. 19, 2013, the entire specification of each of which is incorporated in its entirety hereby by reference. The present application is also a continuation-in-part of U.S. patent application Ser. No. 14/049,189, titled "CROWDSOURCED IMAGE ANALYSIS PLATFORM", filed on Oct. 8, 2013, which is a continuation of U.S. patent application Ser. No. 13/840,993, titled "CROWDSOURCED IMAGE ANALYSIS PLATFORM", filed on Mar. 15, 2013, which claims priority to U.S. provisional patent application Ser. No. 61/766,677, titled "CROWDSOURCED IMAGE ANALYSIS PLATFORM", filed on Feb. 19, 2013, the entire specification of each of which is incorporated in its entirety hereby by reference.

The present application is also a continuation-in-part of U.S. patent application Ser. No. 13/840,173 titled "SYSTEM AND METHOD FOR GEOLOCATION OF SOCIAL MEDIA POSTS", filed on Mar. 15, 2013, which claims priority to U.S. provisional patent application Ser. No. 61/766,655, titled "SYSTEM AND METHOD FOR GEOLOCATION OF SOCIAL MEDIA POSTS", filed on Feb. 19, 2013, the entire specification of each of which is incorporated in its entirety hereby by reference.

BACKGROUND OF THE INVENTION

Field of the Art

The disclosure relates to the field of image analysis, and more particularly to the field of platforms for crowdsourcing image analysis activities.

Discussion of the State of the Art

Image analysis has been an important field of technology at least since the period of World War 2, when extensive use of image analysis, photogrammetry, and related technologies was used in conjunction with aerial photography for intelligence and bombing damage assessment purposes (among others). However, the extent of the use of image analysis (particularly image analysis of remotely-sensed images), particularly for identifying or locating targets of interest, has always been limited by the need for highly-trained, specialized image analysts or interpreters. The need for specialized (and expensive) skills has limited the use of image analysis to a correspondingly limited range of applications (notably military, homeland defense, and law enforcement).

The market for image analysis has also historically been limited by the high cost of obtaining images to analyze. In the military arena, the benefits were sufficiently apparent that large numbers of military reconnaissance flights were made over regions of interest since World War 2. But the cost of such flights virtually totally excluded all commercial applications of image analysis. Starting in the 1970s with the Landsat satellite, this began to change as low resolution satellite images became publicly available. A series of new satellites has opened up progressively more applications as the resolution, spectral coverage, geographic coverage, and cost per image have all continuously improved; accordingly, a significant market in commercial remote sensing imagery has emerged. But even this market has been limited from achieving its full potential because of the still-present requirement for expensive, scarce image analysis talent. Some progress has been made in automated image analysis technologies, but for a vast range of current and potential applications, large scale image analysis (such as would be needed when analyzing satellite images of a large region) remains too expensive and too supply-constrained to use.

One common type of image analysis problem is the "search and locate" problem. In this problem, what is needed is to find and to precisely locate one or more targets of interest. For example, in search and rescue, it may be important to find a missing plane using satellite imagery. Another example is the finding and precise location of warships, tanks, or other military targets of interest. Less common but promising applications include such things as assessing hurricane damage by finding and locating damaged buildings and infrastructure, finding and locating potentially important archeological sites (for instance, by identifying possible ruins in deserts), and assessing the scope of a refugee problem by for example counting tents in an area of interest.

Recently, the notion of "crowdsourcing" (using very large numbers of people, each doing a small part of a large task, to accomplish large of complex tasks quickly at extremely low cost) has emerged, and a number of crowdsourcing platforms have been implemented. Some of these address topics of broad general interest (for example, WIKIPEDIA™), and some are more specialized (for example, GALAXYZOO™, where users are shown images of objects from the Hubble Space Telescope and asked to decide if the object shown is a galaxy and, if so, what kind of galaxy it is). Most crowdsourcing platforms to date rely on volunteers to perform the work, although some (such as Amazon's Mechanical Turk) are commercial in nature and pay for crowdsourced work. There have been two general approaches to managing crowdsourced work. In the first, a large, complex or repetitive task is broken up into many subtasks, with each subtask being given to a single worker; as workers complete the subtasks, the results are rolled up and the overall task is completed at low cost. Generally, various means are used to measure the quality or value of the tasks performed by each participant, so that over time a reputation or quality score can be assigned to each participant; in some cases, work is assigned based at least in part on these reputation or quality scores. The work distribution and quality measurement approach is used, for example, by Amazon's Mechanical Turk platform. A second common approach to crowdsourcing is to use an essentially democratic process to have a crowd decide a difficult question. The process is referred to as "democratic" because each participant simply votes on what the participants believes the answer to be (this is helpful for classification problems such as that described above for GALAXYZOO™).

While aspects of both of these problems are relevant to the broad search and locate application domain, neither of them is sufficient. Consider the refugee assessment problem just described. The work distribution approach can clearly be used to divide up the task for distribution to many participants (typically volunteers). Similarly, the democratic approach could be used by the platform to decide whether something is or is not a tent, based on the number of votes each classification of a specific object received. But neither of these dominant approaches is satisfactory, and the two together are not satisfactory either, for the search and locate problem. It is not enough to divide and conquer, because in searching an image for a specific object considerable ambiguity will be present, and if each image segment is only viewed by a single person, there would be a high likelihood of missed targets (and indeed of false positives). If multiple participants are shown the same image and a vote is taken to decide if a target of interest is present, the outcome is better, but even in this case there are problems. Consider again the refugee problem—if there are in fact ten tents in a given field of view (image segment), various participants might report anywhere from three to twelve tents in the segment. A simple average of these counts could be taken, but would likely be inaccurate. But the "search and locate" problem also requires that the location of each tent be identified (at least implicitly—it is not so important in this particular problem that the exact location of each tent is known, but it is important to use locations to resolve count ambiguities; in most search and locate problems, though, the location aspects is a key output).

What is needed in the art is a platform for crowdsourcing the search and locate class of problems that accurately translates a large amount of crowdsourced inputs into an estimate of the precise locations of a number of targets of interest.

SUMMARY OF THE INVENTION

Accordingly, the inventor has conceived and reduced to practice, in a preferred embodiment of the invention, a platform for crowdsourcing the analysis of images, and particularly for a closed-loop analysis model to geolocate one or more targets of interest.

According to a preferred embodiment of the invention, A crowdsourced search and locate platform comprising an application server comprising a plurality of programming instructions stored in a memory operating on a network-connected computing device and adapted to receive input from a plurality of user devices via a communication network and to perform navigation operations based at least in part on at least a portion of the received input, the navigation operations comprising at least the selecting of a plurality images corresponding to a particular geographic location and sending at least a portion of those images to a user device, and receiving input from the user device comprising at least a plurality of tagging data provided by the device user; and a client interface application comprising a plurality of programming instructions stored in a memory operating on a network-attached computer and adapted to display a plurality of interactive elements to a user, receive input from the user, and provide the results of the input to the application server, is disclosed.

According to another preferred embodiment of the invention, a method for conducting crowdsourced search and locate operations, comprising the steps of receiving, at an application server, a plurality of communication connections from a plurality of user devices via a communication network; navigating a to a specific geospatial location based at least in part on input received from a first user device; sending an image corresponding to the geospatial location to the first user device; and receiving tagging data from the first user device, the tagging data corresponding to a plurality of objects and locations identified by the user of the device, is disclosed.

According to another embodiment, a method for administering a crowdsourced search and rank platform, comprising the steps of displaying, via a client interface application, a first plurality of interactive elements enabling an administrative user to review tagging data; displaying a plurality of image sections that were viewed by participating users in a map-style display illustrating their geospatial relation; and displaying at least a portion of tags of a type selected by the administrative user that were generated by participating users in the crowdsourced search and locate campaign, by placing visual indicators at each tagged location of objects of the selected type within the plurality of image sections, is disclosed.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 9 is an illustration of an exemplary user interface, showing several images with crowd-identified features arranged on a map display according to their geospatial location.

DETAILED DESCRIPTION

Figure 1:
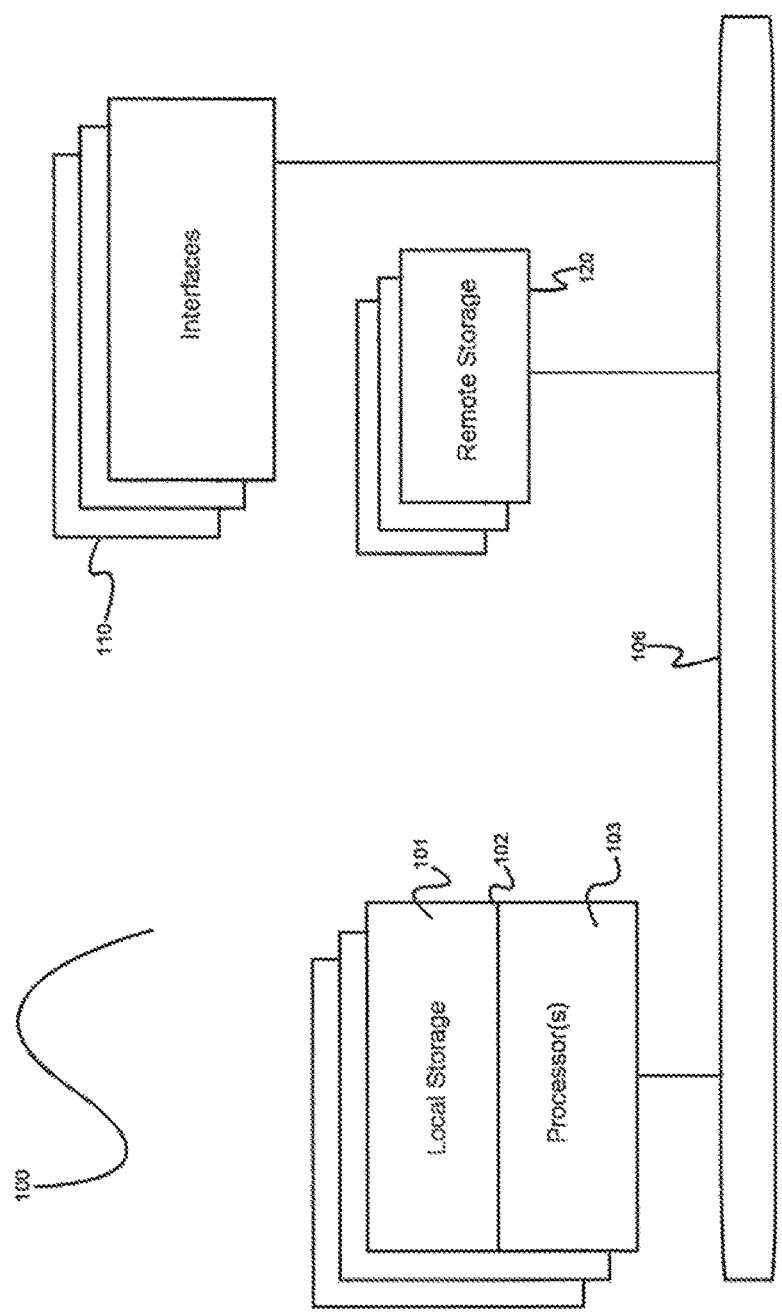
FIG. 1 is a block diagram illustrating an exemplary hardware architecture of a computing device used in an embodiment of the invention.

The inventor has conceived, and reduced to practice, in a preferred embodiment of the invention, a platform for crowdsourcing the analysis of images, and particularly for a closed-loop analysis model to geolocate one or more targets of interest.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art.

Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Similarly, preferred embodiments of the invention are described in terms of a web-based implementation, including components such as web servers and web application servers. However, such components are merely exemplary of a means for providing services over a large-scale public data network such as the Internet, and other implementation choices may be made without departing from the scope of the invention. For instance, while embodiments described herein deliver their services using web services accessed via one or more webs servers that in turn interact with one or more applications hosted on application servers, other approaches such as peer-to-peer networking, direct client-server integration using the Internet as a communication means between clients and servers, or use of mobile applications interacting over a mobile data network with a one or more dedicated servers are all possible within the scope of the invention. Accordingly, all references to web services, web servers, application servers, and an Internet should be taken as exemplary rather than limiting, as the inventive concept is not tied to these particular implementation choices.

As used herein, "crowdsourced" refers to the use of large numbers of participants, each working independently of the others over the Internet, to accomplish a complex or large (or both) task provided by a requesting entity. Generally, the task is divided into many subtasks, each of which can be completed satisfactorily by a human without reference to any other information beyond what is provided with the subtask. These subtasks are distributed by a "crowdsourcing platform" to many different participants, some of whom receive more or less subtask volume based on quality, cost, willingness, or other parameters. In some cases, participants "pull" subtasks from an inventory of pending subtasks. Some subtasks may be submitted to more than one participant, while others may be provided only to one participant. As each participant completes the subtasks assigned (or pulled), the resulting work is aggregated by the platform and a completed set of results for the overall task is provided to the original requesting entity.

As used herein, "crowdsourcing campaign" refers to a specific instance of a crowdsourcing application used to solve a specific problem. For instance, a crowdsourced image analysis platform of the invention facilitates image analysis by many users; a crowdsourcing campaign organizes such activities (and such users) for a specific image analysis problem. For example, a crowdsourcing campaign might be set up and operated whose goal is to find a downed airplane. Generally the crowdsourcing platform will be configured generally for a plurality of campaigns, but a specific campaign will have its own configuration; in the example given, the campaign's configuration would include the expected region of interest and imagery associated with it, particular details about how to distribute image analysis tasks in the campaign, what criteria will be used to identify to a requesting entity when a target of interest is identified and what confidence level exists for the identification, and so forth.

As used herein, "search and locate" refers to a general class of problems wherein a set of images is searched for particular classes of targets (such as buildings, tanks, railroad terminals, downed airplanes, etc.). It is common that the set of images may be searched to find more than one class of targets (for example, to find all targets of military interest), although single target class searches may also be performed ("find all cars"). Moreover, in some cases it may be known or presumed) in advance that only a single target of interest exists (a lost climbing party, or a downed airplane), while in most cases the number of targets present in a given image set is unknown. The second part of the search and locate problem is to precisely locate any resulting targets of interest (where is the down plane or lost party of climbers?).

As used herein, "image analysis" refers to the analysis of images obtained from one or more image sensors; generally, a single analysis task focuses on a set of images of a single region of interest on the earth. Satellite and aerial imagery are common examples of imagery that are subjected to large scale image analysis. However, the invention described herein is not limited to common remote sensing image analysis problems associated with satellite and aerial imagery. For example, analysis of large image sets from traffic cameras may be performed using techniques described herein.

As used herein, a "requesting entity" is a person or organization that requests a specific set of crowdsourced image analysis campaigns to be carried out via a crowdsourcing platform. That is, a crowdsourcing platform may be operated by a single organization specialized in hosting such a platform, and be made available to a wide range of requesting entities (i.e., third parties) who may sign up for, manage, and pay the platform operator to execute various crowdsourcing campaigns. For example, a government agency seeking to augment a search and rescue operation may be a requesting entity, setting up an image analysis campaign on a crowdsourcing platform.

As used herein, a "participating user" is a person, or a group of persons, that participates in a crowdsourcing campaign as a provider of service. Crowdsourcing relies on distributing tasks to a crowd; that crowd is comprised of participating users.

As used herein, "tags" are data points created by a participating user's "tagging" a specific point as corresponding to a specific target type. For instance, a participating user may place his cursor over a location on an image that was presented to him, and select "tank" in order to generate a tag that states that a tank is present in that image at that location.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
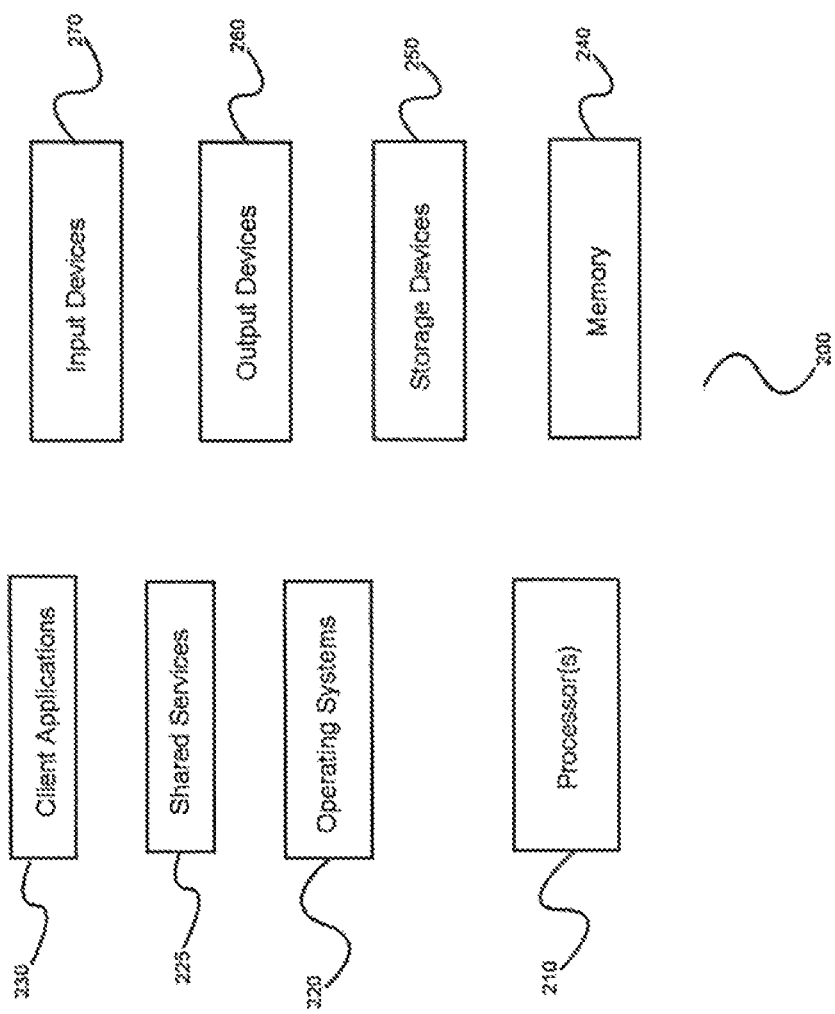
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to a system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
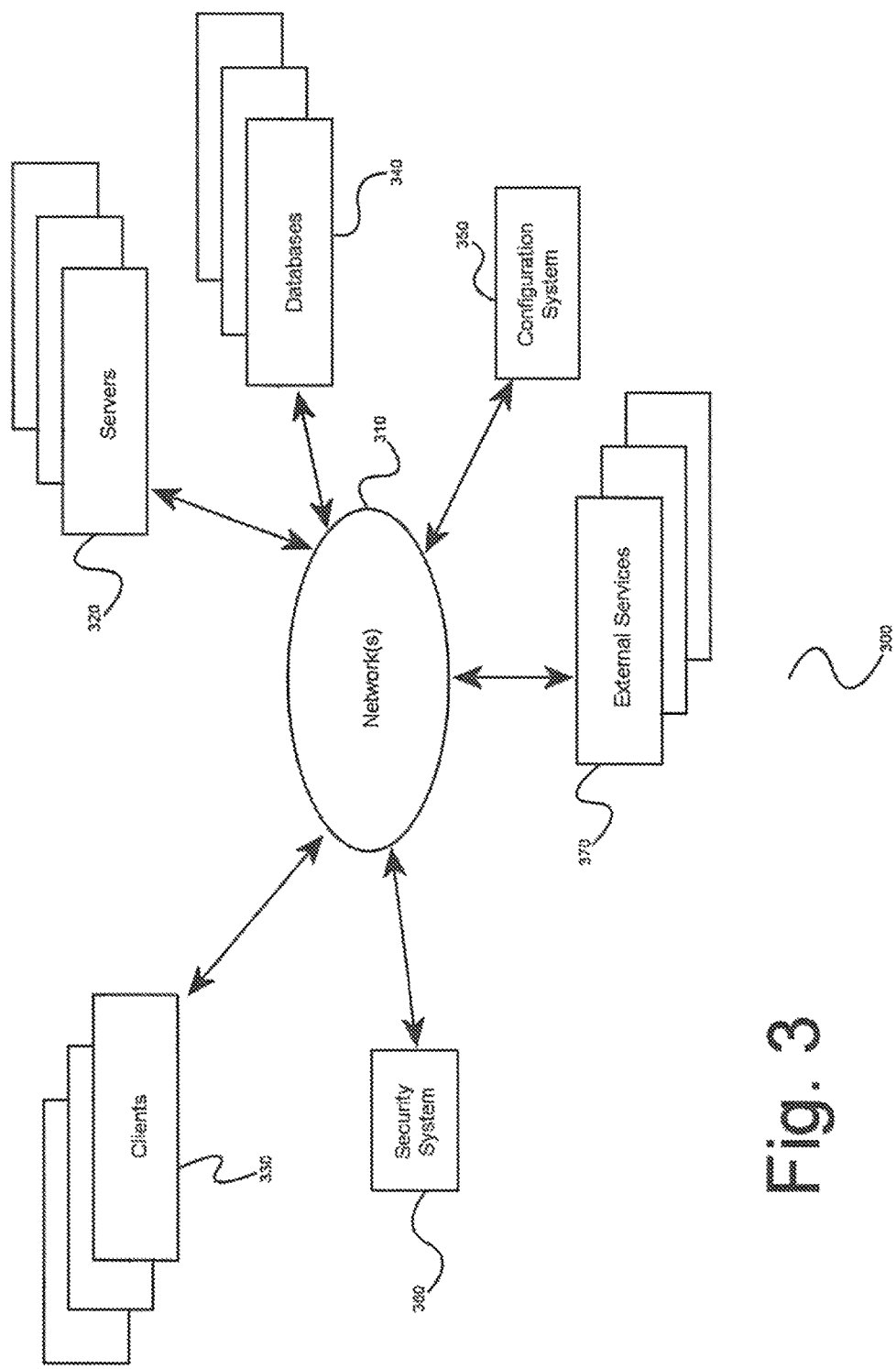
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330.

Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
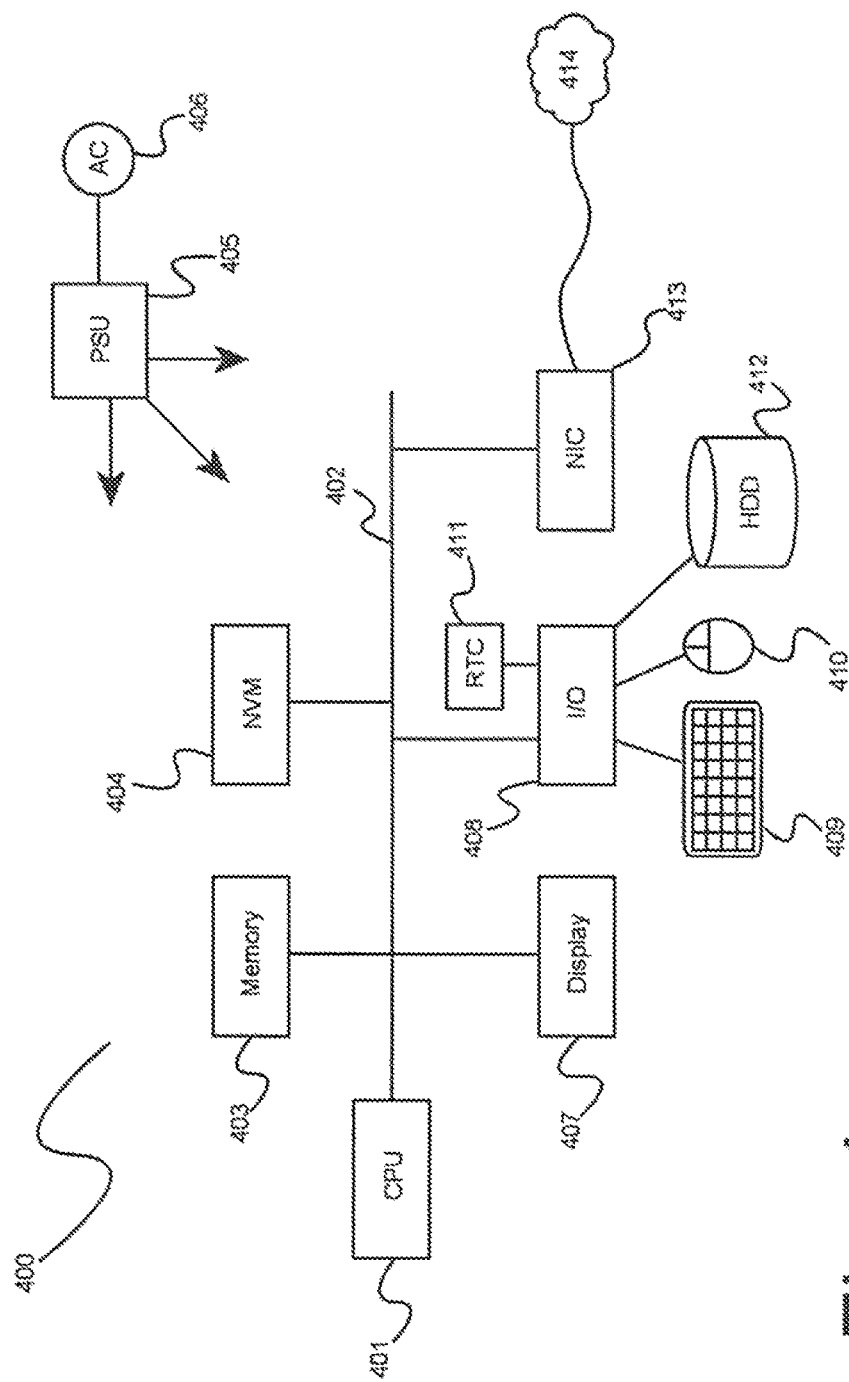
FIG. 4 is another block diagram illustrating an exemplary hardware architecture of a computing device used in various embodiments of the invention.

FIG. 4 shows an exemplary overview of a computer system 800 as may be used in any of the various locations throughout the system. It is exemplary of any computer that may execute code to process data. Various modifications and changes may be made to computer system 800 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
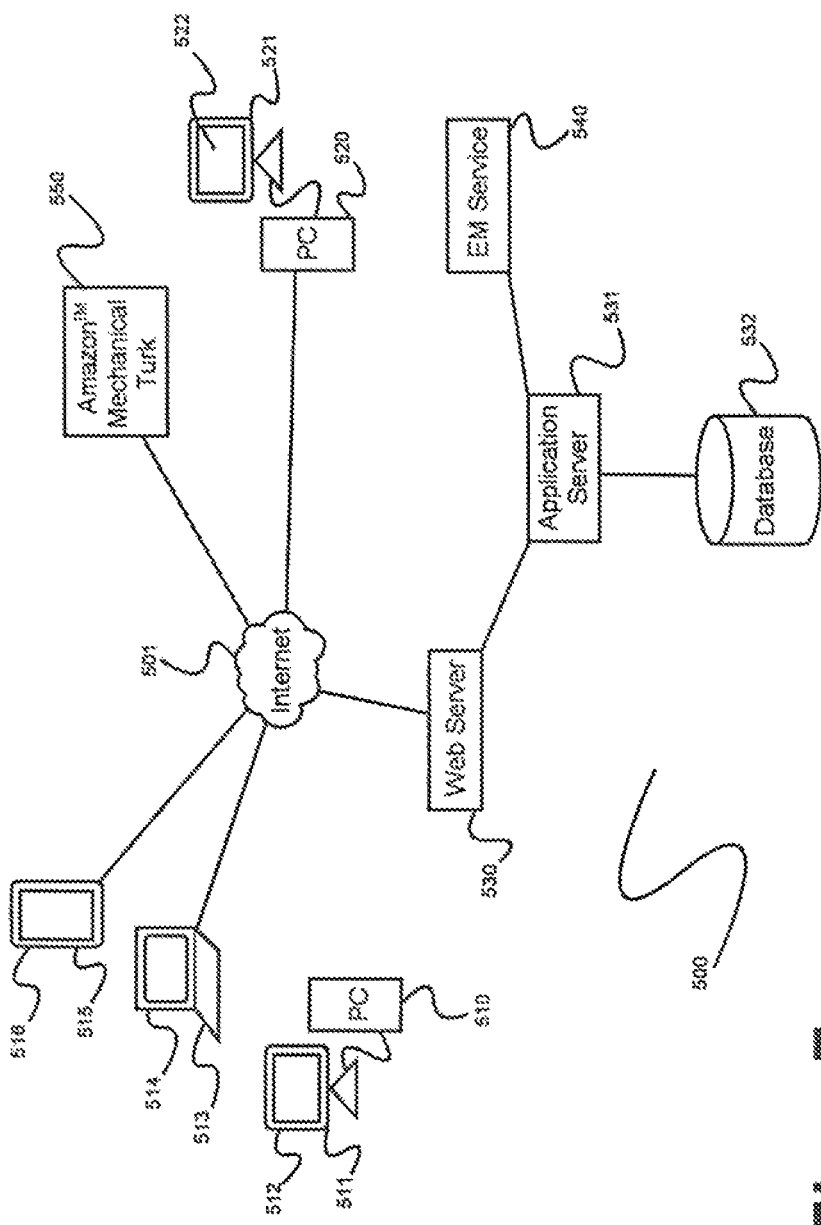
FIG. 5 is diagram of an exemplary architecture for a platform for crowdsourced image analysis, according to a preferred embodiment of the invention.

FIG. 5 is a diagram of an exemplary architecture for a platform 500 for crowdsourced image analysis, according to a preferred embodiment of the invention. According to the embodiment, crowdsourcing is accomplished by distributing image analysis tasks to various participant users, who typically access platform 500 via Internet 501 from tablet devices 515, laptops 513, personal computers 510 with monitors 511, or other Internet-accessible computing devices. Access to platform 500 is typically, although not necessarily, made using a browser 512, 514, 516 (or a similar Internet-connected software application). As is typical of Web applications, platform 500 may be accessed by participating users via web server 530, which may comprise web server software such as Microsoft Internet Information Server, Apache Web Server, IBM Websphere Web Server, or any other web server known in the art, stored and operating on a single network-attached server computer or a cluster of server computers, or it may comprise such software operating on a plurality of such machines, and may be placed behind a load balancer (not shown) that distributes requests among the various instances of web server 530. As is typical of Web applications, participant user requests pass from browsers 512, 514, 516 via Internet 501 to web server 530, which stores and returns static web page elements locally, and passes application-specific requests to application server 531. Application server 531 may be any particular form of application server known in the art, such as Apache Tomcat or Geronimo, Java Platform Enterprise Edition, RedHat JBoss AS, Windows Server, or IBM WebSphere Application Server; further, it will be understood by one having ordinary skill in the art that this list is merely exemplary and is in no way limiting. Application server 531 may comprise application server software stored and operating on a single network-attached server computer, or it may comprise such software operating on a plurality of such machines, and may be placed behind a load balancer (not shown) that distributes requests among the various instances of application server 531. As is common in the art, application server 531 uses a database 532 to store application-specific data. Typically (although not necessarily), application server 531 will offer a stateless representation state transfer (REST) application programming interface (API) to users via web server 530, and accordingly all application state data is maintained in database 532, which facilitates scalable operations (since each application server 531 instance is not required to maintain state information separately, and since the need for complex state propagation between application servers is thereby eliminated. Of course, it will be appreciated by one having ordinary skill in the art that the general architecture of a web server 530 coupled to an application server 531 via a REST API, with database 532 storage of application data, is typical of scalable web applications but is also merely exemplary. It may be desirable in some cases for a client-server connection between dedicated applications 512, 514, 516 and a dedicated server software 531 that uses a proprietary interface and could even be a stateful server application.

With this basic architecture in mind regarding the connections between participating users and application server 532, specific aspects of the invention will now be described. Before participating users can participate in a crowdsourcing campaign, a requesting entity must set up the campaign. Requesting entity (and administrative) users interact with application server 531 via the Internet 501 and web server 530 just as participating users do; a single PC 520 with monitor 521 and browser 522 is shown in FIG. 5 to represent administrative and requesting entity users (it should be noted of course that only PC 520 is shown for brevity; as with participating users, administrative/requesting entity users may use any suitable Internet-capable computing device according to the invention). Requesting entity users will generally create and manage crowdsourced image analysis campaigns, and will view results of such campaigns (possibly adjusting the settings of such campaigns as a result of such reviews, to improve the performance of such campaigns). Once a campaign is set up, it may be activated by the requesting entity, at which point participating users may "join" the campaign and thereupon start receiving image analysis tasks associated with the campaign to perform. In a preferred embodiment, images are delivered form database 532 to participating users by application server 531 via web server 530, and participating users interact with such images in web browsers 512, 514, 516 using tools provided by application server 532. In some embodiments, however, third party crowdsourcing platforms such as Amazon's Mechanical Turk 550 may be used to manage a crowdsourced image analysis campaign using images and requirements provided by application server 531 or directly from database 532.

As noted above in the background section, one common challenge in search and locate problems, which is not addressed by current crowdsourcing techniques (which, as noted, use either or both of the work distribution with quality measurement and the democratic/voting techniques), is the problem of accurately finding and locating targets of interest using crowdsourcing. The shortcomings of the two main crowdsourcing approaches (work distribution and voting) are different for each approach. The work distribution approach is still useful in search and locate problems, but it is not adequate by itself, as it does not provide a means for locating targets of interest, particularly when many participating users "tag" the same target of interest, often with varying locations (generally nearby, but in some cases even quite distant from each other). The voting approach, while excellent for ranking reputations (is this a good song or not?) or for classification problems (is this a tank or not?), does not handle continuous variations of input data well. That is, voting is good when there is a small set of possible options (which is this: a dog, a cat, or a skunk?); the resulting tallies for each discrete element of the set can be compared and a "winner" selected (it's a cat). But when the input provided by participating users is not only the presence of an object but also its two-dimensional location (or even three-dimensional location), the simple voting approach does not help to answer the question, "where is it, really?"

Accordingly, in a preferred embodiment platform 500 further comprises a crowdsourced search and locate service 540, which may be stored and operating on a single network-attached server coupled to application server 531. In some embodiments, crowdsourced search and locate service 540 operates on a large number of independent machines whose activities may be coordinated using an approach such as the well-known map/reduce technique. crowdsourced search and locate service 540 takes as inputs a (typically large) set of tags from many participating users. Fundamentally, crowdsourced search and locate service 540 implements a crowdsourced search and locate algorithm (described in detail below) that attempts to determine a "most likely" set of targets that are present in an image, using a large amount of tagging data obtained from participating users viewing the same or related images. Because location tagging is an inherently noisy process (people vary widely, at a minimum; in addition, some viewers may view an image at higher resolution than others, while some may tag an extensive object at its centroid while others tag it at various points on its edges, and so forth). Therefore, it will usually be the case that tag data input to the crowdsourced search and locate service 540 is very noisy; for example, if there are several targets of interest close to each other "in the real world" (i.e., in the place from which the image was taken, at the time the image was taken), the inevitable inaccuracies in users' tagging may result in (for example) a single cloud of nearby tags that might be interpreted as belonging to a single target of large extent but actually belongs to two or more "real" targets. The crowdsourced search and locate algorithm may optionally take as input one or more sets of prior data, for instance regarding the quality of a specific set of participating users' previous tagging work; such prior data will (as described below) be used to improve the time to convergence of the algorithm. Given these inputs, the crowdsourced search and locate algorithm uses an iterative expectation-minimization process to generate, as outputs, three sets of data. The first is an array of quality scores for the taggers (the participating users who created tags as part of the crowdsourcing campaign whose data is being analyzed by the crowdsourced search and locate algorithm). The second is an array of difficulty scores for each tagged target. The third is an array of estimated locations of actual targets, comprising for each target data such as the latitude and longitude of the target, the type of the target (tank, railroad car, damaged building, debris field, etc.), and a confidence level in the identification.

A crowdsourced search and locate algorithm is ideally focused on identifying an underlying hidden variable (the real targets that existed at a time of interest) using incomplete data (the tagging data, which won't necessarily have tags for all of the real targets, and which may have many tags for each real target). In order to move from the inputs (principally tag data, each tag comprising a tag identifier, a tagger identifier, a location (latitude and longitude, or a UTM grid point and easting and northing values for the offset from that UTM grid point), the crowdsourced search and locate algorithm carries out a key data transformation, the uses a modified iterative expectation-minimization (EM) algorithm to generate a set of intermediate outputs, then performs a clustering on the interim outputs to arrive at the final crowdsourced search and locate output. The details will be described below, but at a high level the initial data transformation involves converting straightforward geolocation information (a series of tags generated by participating users) into a set of agreement/disagreement data (meaning agreement or disagreement among the participating users of the input set). Also, since EM algorithms known in the art take an input vector and a parameter vector and attempt to identify a vector corresponding to a hidden variable of which the input vector represents a (possibly noisy) subset, in the crowdsourced search and locate algorithm the vector of quality scores and the vector of difficulty scores are mathematically combined and treated as the parameter vector for EM algorithm purposes.

From a use case perspective, what is accomplished using platform 500 includes: setting up (by requesting entities) image analysis campaigns; running the campaigns to generate tag sets from participating users; displaying the results to one or more requesting entity users; and using the crowdsourced search and locate algorithm with the results as input to generate an estimate of ground truth (that is, an estimate of the actual targets of interest and their locations) and displaying the same to the requesting entity users.

DETAILED DESCRIPTION OF EXEMPLARY EMBODIMENTS

Figure 6:
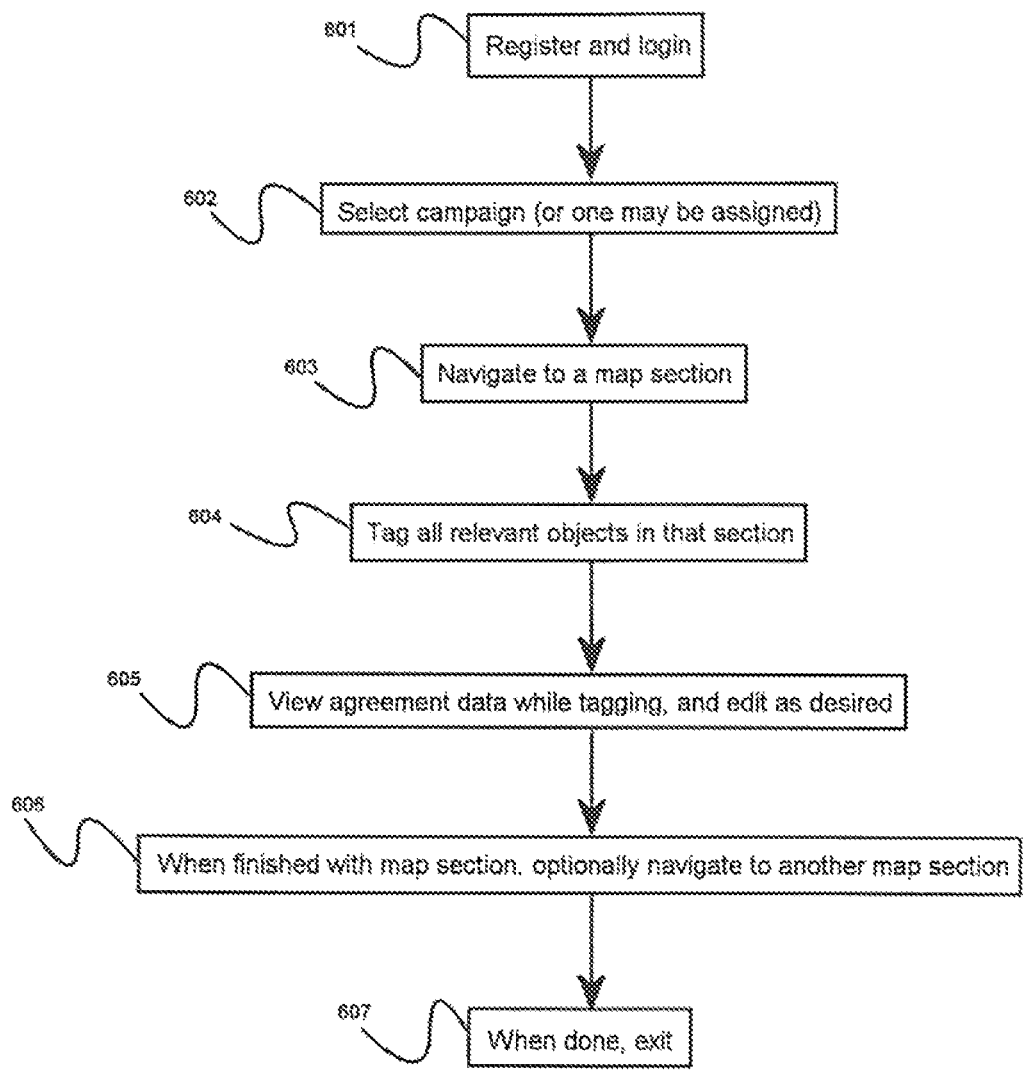
FIG. 6 is a method flow diagram illustrating a method for crowdsourcing image feature analysis, according to a preferred embodiment of the invention.

FIG. 6 is a process flow diagram of a method 600 to allow a plurality of users to participate in crowdsourced image analysis, according to a preferred embodiment of the invention. According to the embodiment, in step 601 a participating user may register with platform 500 (thereby obtaining a user identifier), and once registered, may log in to platform 500 in order to participate in one or more crowdsourced image analysis campaigns. It will be appreciated by one having ordinary skill in the art that there is a variety of information that may be obtained by platform 500 during user registration, such as user name, user background, type of user (volunteer, paid, etc.), organizational membership, tagger group memberships, and the like. For example, a new user may register as a member of an organization that is focused on a particular campaign, set of campaigns, or type of campaigns (for example, a "league of armchair military analysts", whose members focus only on military analysis, such as tracking developments in combat areas such as Syria or Mali); alternatively or also, a user may register as a member of one or more existing "tagger groups" (such as search and rescue, climate change damage assessment, and so forth). In some embodiments, "passive login", such as logging in using Facebook™ or Mechanical Turk™ credentials, may be provided; for example, a user may be logged in automatically with an identifier corresponding to his Mechanical Turk™ or Facebook™ identifier, and the user would therefore not see a login process occurring. Once a participating user has logged in, he may be presented with a list of active campaigns for which he is eligible (campaigns may be unrestricted, meaning every registered user is eligible to participate, or they may be limited to participating users from specific organizations or tagger groups, or to participating users who satisfy some criterion such as experience level, average quality rating, Mechanical Turk™ qualification, etc.). Upon viewing such a list of available campaigns, in step 602 the user may select a campaign in which he wishes to participate; alternatively, in step 602 platform 500 may automatically assign the user to a specific campaign upon login. In support of the selection process of step 602 (when performed manually by a participating user), the user may be shown a list (using any of the many well-established user interface conventions for displaying lists from which selections are to be made) of available campaigns that the specific user may participate in. In some embodiments, some campaigns may be limited to certain classes or groups of participating users; for example, a sensitive law enforcement campaign may only be made available/visible to qualified law enforcement personnel (this may actually occur, for example, when a high-profile search for a target is needed, and law enforcement personnel from a wide variety of agencies may desire to assist informally, without sensitive information being divulged to the public at large). In some embodiments, campaigns may be assigned automatically by platform 500 in step 602, for instance where new participating users are assigned to a specific training campaign until they complete the required training or otherwise demonstrate proficiency.

Once a campaign has been selected by or for a participating user, in step 603 the user may navigate to a specific map section to carry out tagging operations (that is, to attempt to identify and locate targets of interest in the map section to which the user has navigated). Again, as in campaign selection, in some embodiments automated action may be taken in step 603, rather than allowing a user to manually select a map section for viewing. For example, it may be important that users are not provided information about the actual map location (that is, grid coordinates or latitude and longitude) of map sections as they view them and carry out tagging operations. In some cases, it may be important that users are unable to identify the actual, physical location of a target of interest on the earth's surface (for instance, to prevent looting of valuable archaeological sites). Accordingly, users may be "navigated" automatically in step 603, by being shown successive map sections without their spatial locations or relationships being known. In some embodiments, platform 500 may enforce a sampling regimen wherein various map segments are assigned probability levels (of having targets of interest in them) or interest levels, and the number of participating users who are encouraged or made to view specific map sections may vary accordingly (more users might be assigned to more interesting, promising, or difficult map sections). Similarly, in some embodiments users may be provided an option to manually navigate or to have the system navigate for them (for instance, they could be provided a "next" button, or a "surprise me" button, as well as a small map of an entire interesting region via which they can manually navigate by selecting a map segment using for example a computer mouse or a touchpad). Once a participating user is "in" (i.e., viewing) a particular map segment, the user tags all relevant objects (targets of interest) in that section in step 604 (of course, it should be apparent that not all users will find all actual targets in any given map segment; skill, persistence, and interest level—among other variables—may cause some to tag only a subset, and others to tag false targets of interest, and so forth). In some embodiments, in step 605 a participating user may view agreement data while tagging objects. For example, when a user moves a graphical cursor to a specific map location and selects an action (e.g., "tag as tank"), a graphical indicia may be displayed advising the user how many other users placed a similar tag there (or within a reasonable—and configurable—distance from the user's cursor location); in some embodiments, a second graphical indicia such as a colored cursor, may be provided to indicate a position of the centroid of a set of other users' tags, effectively indicating to the participating user information such as, "ten other people tagged a tank, but the group locates the tank at this slightly different location". Accordingly, users may be provided a means to edit their tags (for example, by clicking and dragging their tag onto the marked centroid position, or to adjust its position relative to an underlying image feature, as desired). When editing is completed in step 605, a user may simply move on to make another tag, or may be provided with a positive confirmation means, such as a clickable "Tag" button, to indicate that a particular tag will no longer be edited, but a new tag may be placed in the current map segment. In some embodiments, some or all users may not be shown agreement data, for example to encourage "open minded" tagging by suppressing feedback from other users' activities.

In step 608, once a participating user is finished tagging objects in a specific map section (typically, because either the user is bored with a particular map section, or the user believes she has tagged all targets of interest), the user may navigate to another map section (again, manually or automatically), and resume carrying out method 600 in step 604. In step 607, when a user is finished, either because the user decides to complete their tagging session, or because a campaign setting is reached (for instance, a campaign might specify that no user should do more than ten map sections at a time), then in step 609 the user exits method 600 (typically by navigating away from the web page provided by platform 500 for participating users).

Figure 7:
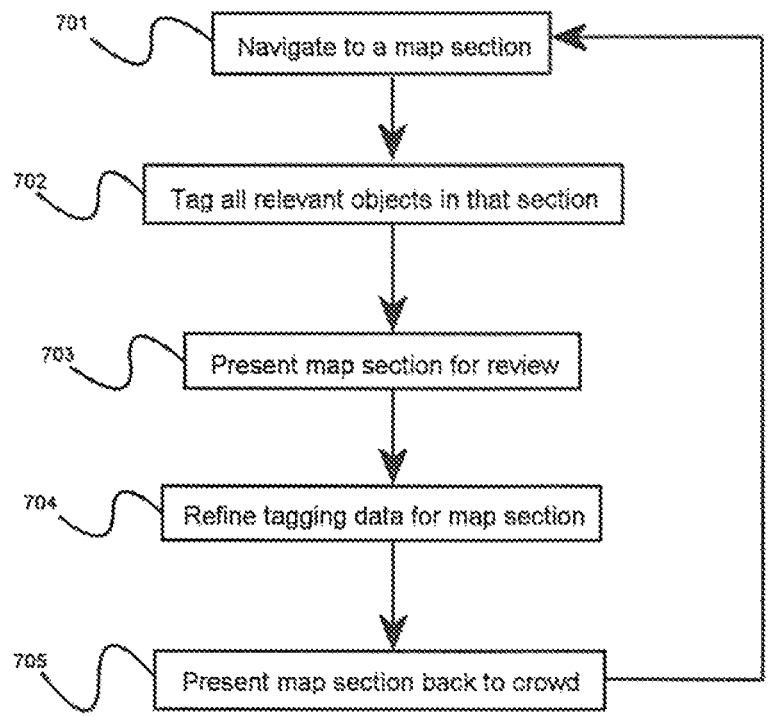
FIG. 7 is a method flow diagram illustrating a closed-loop method for crowdsourced feature analysis, according to a preferred embodiment of the invention.

FIG. 7 is a method flow diagram illustrating a closed-loop method 700 for crowdsourced feature analysis, according to a preferred embodiment of the invention. According to the embodiment, in step 701 a participating user may navigate to a map section to carry out tagging operations (that is, to attempt to identify and locate targets of interest in the map section to which the user has navigated), as described previously (referring to FIG. 6). In a next step 702, a user may tag objects or areas of interest within a map section as described previously (again, referring to FIG. 6), such as to identify particular features that are visible. For example, a user viewing a satellite image of a campsite area might tag parked recreational vehicles or visible animal dens, such as to improve the camping experience for other users ("avoid this area, there are bears here", "this area seems to be popular, check it out").

In a next step 703, a map section may then be presented for review with tagging information included from previous operations (as in step 702). During a review operation in step 703 the tagging information within a map section may be refined by a reviewer to improve results. Review may be accomplished via any of a number of suitable means, such as an automated system that may receive map sections to refine or otherwise review and interact with tagging data, such as to remove duplicate or erroneous entries. Review may also be performed by a human analyst, that may receive map sections for viewing and manually examine the tagging information to identify any needed changes, again such as removing duplicate or bad entries, or identifying areas that may need refinement, or any other suitable operation that may be performed on tagging information within a map section.

In this manner, it can be appreciated that a review step may be used as a control element to handle erroneous, useless, or malicious tagging information, such as when a user may have mistakenly or intentionally identified a feature incorrectly. For example, when tagging positions of strategic value such as military positions or targets, it may be possible for users loyal to the target party to intentionally tag incorrectly in an attempt to thwart intelligence gathering. By utilizing a review step, such input may be filtered out to improve the quality of a tagging process overall and ensure reliable operation. Additionally, during review a map section may be tagged by a reviewer to identify further work needed, such as requesting clarification or refinement by crowdsourcing participants ("This needs another look"), or a need for an improved image to work with ("needs a better satellite image"). For example, in a map section image where features are difficult to identify or natural features make it difficult to determine details, a reviewer may identify this as an area of high disagreement (for example, if a large number of users have submitted conflicting tags), and may optionally tag the map section for further crowdsourced review. In this manner, not only can bad data be removed but requests for new data can be made to further improve results of a crowdsourced identification process.

In a next step 705, a refined map section may be sent back for further crowdsourced participation, such that users may continue to identify features and refine tagging information within a section and continually improve quality and relevancy of identification. In this manner, it can be appreciated that a tagging operation may be performed as a closed-loop process, wherein users identify and tag features in a map section, map sections are then reviewed and refined, and map sections are then presented for further user interaction (and subsequently looping over a review and tagging process). In this manner, a tagging operation may continually refine results such as by utilizing a wider user base in a crowdsourcing operation (by presenting a map section to multiple users over a period of time), and by utilizing a review step to handle invalid, useless, or misleading information to improve quality of tagging data in map sections. Additionally, a further feature that may be utilized to improve quality and relevancy of results may be the inclusion of crowd input on map sections themselves, i.e. crowdsourcing participants may identify map sections with features needing identification, or map sections that are deemed to be likely to have features, such as to request particular map sections or new map imagery of sections for further crowdsourced tagging.

A further function that may be utilized, is that of ranking crowdsource participants, such as based on previous tagging operations. For example, a user may be identified as having a history of relevant and precise results, indicating that they may be very skilled at identifying certain features or within certain map section types (such as someone who is good at tracking animals through wilderness areas, or who may be skilled at identifying military encampments or vehicles). Such information may be utilized when presenting map sections for further review or tagging (such as in steps 703-705, as described previously), such that map sections may be presented to users most likely to provide useful information. In this manner, tagging operations may be optimized by presenting map sections to users that are identified to be more likely to return useful results, and further minimizing erroneous or misleading information by avoiding users identified to have a history of submitting bad results (such as "trolls", or users who may intentionally submit misleading or false information in an attempt to disrupt operation or skew results).

Figure 8:
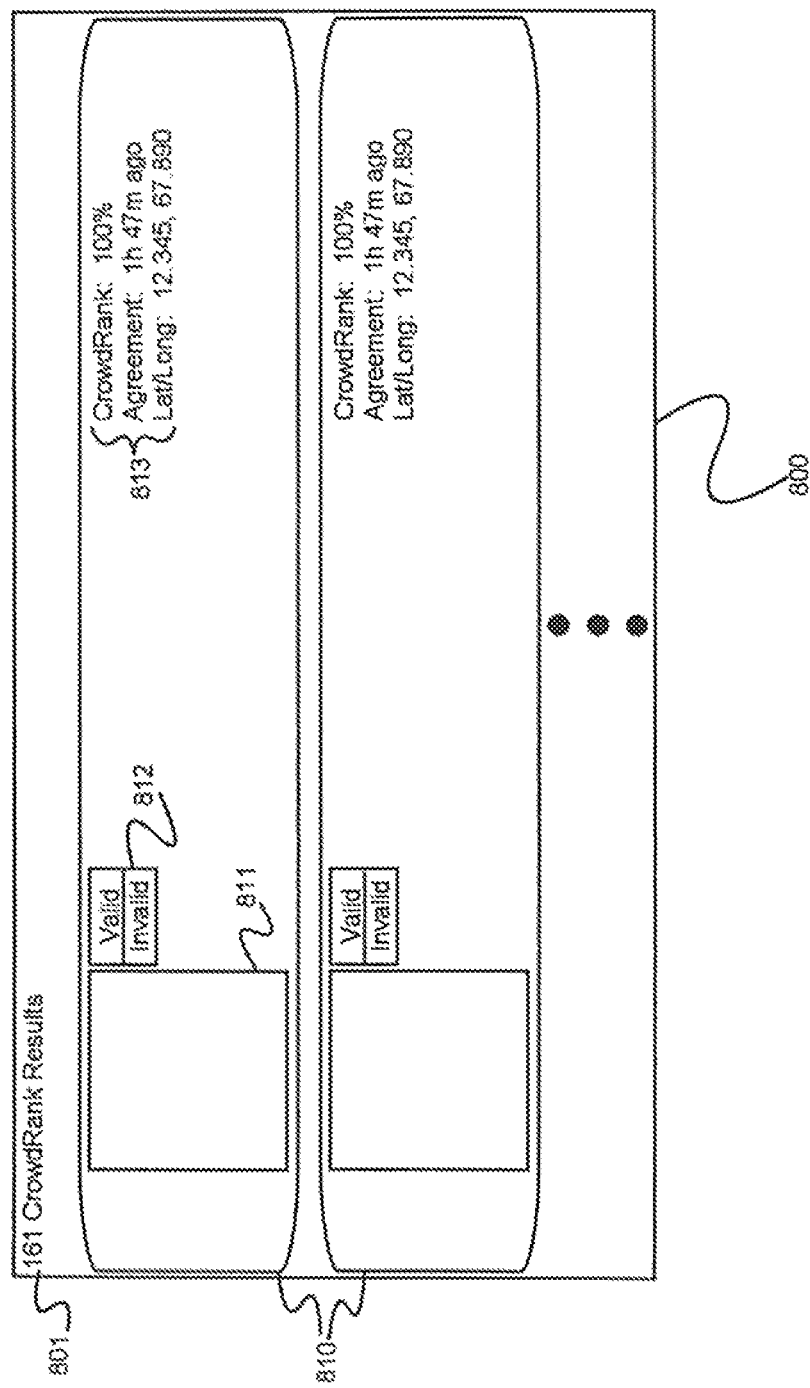
FIG. 8 is an illustration of an exemplary user interface, showing several crowdsourced feature identification results.

FIG. 8 is an illustration of an exemplary user interface 800, showing several crowdsourced feature identification results, as might be presented to a reviewer for refinement. As illustrated, a total count of results may be displayed 801, such as to notify a reviewer of how many results are pending review. Individual results 810 may be displayed for review, optionally in an ordered fashion such as sorted by agreement rating, time submitted, or any other preset or configurable metric that may be used to sort or organize results for easier viewing.

An individual result 810 of a crowdsourced tagging operation may be presented with an image 811 of a relevant map section being tagged, optionally with tag information or markers visible (such that a reviewer may rapidly identify tagging information such as how many features were identified or how much agreement/disagreement there is on the position of features). Each result may have clickable or otherwise interactive interface elements 812 to enable a reviewer to interact with a map section, such as (as illustrated) to accept a map section as "valid" (i.e., tags are correct and useful) or mark as "invalid", such as when tags need to be removed as invalid or useless, or further tagging is needed for a map section to be useful. A variety of associated information 813 may be displayed with each result, such as a ranking of how much crowd agreement there is on the tagging information displayed, time when a map section was submitted for review, or coordinate or other location information relevant to an area shown in a map section image. In this manner, results may be displayed in a compact and useful manner to expedite review operations.

FIG. 9 is an illustration of an exemplary user interface 900, showing several images with crowd-identified features arranged on a map display according to their geospatial location, as might be presented to a reviewer or a crowdsource participant for selecting a map area to perform tagging operations. As illustrated, a map area 900 may be displayed with map section images 901 arranged according to their geospatial location (such as to indicate actual location or relation of map sections, rather than simply using coordinates or arbitrary information to represent their location). In this manner, map sections may be displayed in a manner indicative of their actual physical location or arrangement, such as might make it easier for a reviewer or crowdsourcing participant to identify map sections for review or interaction. For example, a crowdsource participant may wish to perform tagging operations on a geographic location with which they are familiar, and may be able to perform a search for a particular location (such as a ZIP code or other appropriate geospatial identifier), and see map sections in or near that area that may be utilized for operation. Additionally, multiple map sections may be displayed in an overlapping manner 902, such as when satellite images are taken of overlapping areas, or multiple images are taken to encompass a large area that would not fit in a single map section. Users (either crowdsource participants or reviewers) may be given an option to view or interact with a single map section of a large segment (i.e., a map section of the usual size representing a subset of a larger area as illustrated as items 902), or to view an entire area as a whole (i.e., viewing the entire area 902 at once, interacting with a larger-than-usual map section to cover an entire area in one operation).

Additionally, a map display 900 may be generated by a reviewer during review operations, such as by arranging map sections on a map display based on their location information (either manually as by a human analyst, or in an automated or semi-automated process performed by a software analyst or review algorithm). In this manner, a map display 900 may be kept accurate and up-to-date, as a reviewer may be prompted or given an option to review the map display and make any needed changes (such as repositioning or aligning map sections such that they more closely represent the map areas). Additionally, during this process a reviewer may be able to "stitch" together or otherwise join or arrange multiple map sections as appropriate, such as when multiple map sections overlap with one another or when multiple images are captured to identify a larger region that may not fit in a single map section normally.

The skilled person will be aware of a range of possible modifications of the various embodiments described above. Accordingly, the present invention is defined by the claims and their equivalents.

What is claimed is:

1. A crowdsourced search and locate platform, comprising:
   an application server comprising at least a processor, a memory, and a plurality of programming instructions stored in the memory and operating on the processor, wherein the programming instructions, when operating on the processor, cause the processor to:
   receive input from a plurality of user devices via a communication network;
   select an orthomosaic image of a portion of the Earth's surface corresponding to a particular geographic location;
   automatically select a plurality of smaller images each drawn from a portion of the orthomosaic image, at least a portion of the plurality of images being selected such that, when combined, they cover a particular area of interest;
   transmit, over a network, at least a portion of the plurality of smaller images to each of at least two user devices;
   receive, over the network, tagging data from at least one of the user devices, the tagging data corresponding to a plurality of objects and locations identified by the user of the device;
   reduce geolocation error for a plurality of features on the earth by analyzing tagging data pertaining to each respective feature; and
   update at least a portion of the orthomosaic image by labeling a plurality of features on the earth, the features being based at least in part on at least a portion of the tagging data; and
   a client interface application comprising at least a processor, a memory, and a plurality of programming instructions stored in the memory and operating on the processor, wherein the programming instructions, when operating on the processor, cause the processor to:
   display a plurality of interactive elements to a user, receive input from the user, and provide the results of the input as tagging data to the application server.

2. The system of claim 1, wherein the user input comprises at least a plurality of tagging data, the tagging data corresponding to at least a plurality of objects and locations identified by the user.

3. The system of claim 2, wherein the tagging data is provided by a user via placing visual indicators at each tagged location of objects of the selected type within the plurality of image strips.

4. The system of claim 1, wherein the client interface application displays a plurality of elements enabling an administrative user to configure and run a crowdsourced search and locate algorithm, wherein the algorithm receives at least a plurality of tagging data provided by participating users in a crowdsourced search and locate campaign, and determines a most likely distribution of actual locations of objects of interest.

5. The system of claim 4, wherein the client interface application displays at least a portion of tagging data of a type selected by a user, the tagging data having been provided by a plurality of other participating users in the crowdsourced search and locate campaign.

6. A method for conducting crowdsourced search and locate operations, comprising the steps of:
   receiving, at an application server, a plurality of communication connections from a plurality of user devices via a communication network;
   navigating a to a particular geographic location based at least in part on input received from a first user device;
   selecting an orthomosaic image of a portion of the Earth's surface corresponding to the particular geographic location;
   automatically selecting a plurality of smaller images each drawn from a portion of the orthomosaic image, at least a portion of the plurality of images being selected such that, when combined, they cover a particular area of interest;
   transmitting, over a network, at least a portion of the plurality of smaller images to each of at least two user devices;
   receiving, over a network, tagging data from the first user device, the tagging data corresponding to a plurality of objects and locations identified by the user of the device;
   reducing geolocation error for a plurality of features on the earth by analyzing tagging data pertaining to each respective feature; and
   updating at least a portion of the orthomosaic image by labeling a plurality of features on the earth, the features being based at least in part on at least a portion of the tagging data.

* * * * *